April 7, 1970  K. KRARUP  3,504,647
FERTILIZER APPLICATOR

Filed April 20, 1967  2 Sheets-Sheet 1

INVENTOR.
KAY KRARUP
BY Lyon & Lyon
ATTORNEYS

April 7, 1970            K. KRARUP            3,504,647
FERTILIZER APPLICATOR
Filed April 20, 1967            2 Sheets-Sheet 2
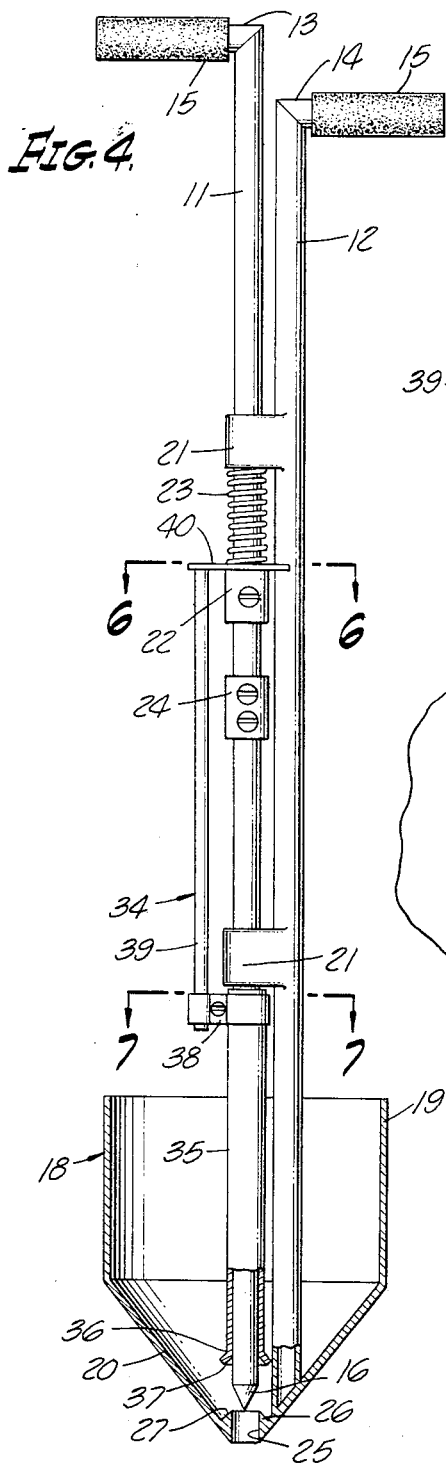
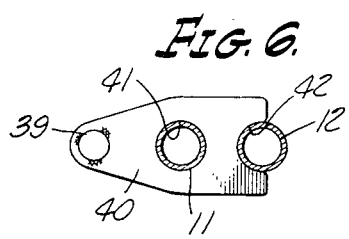
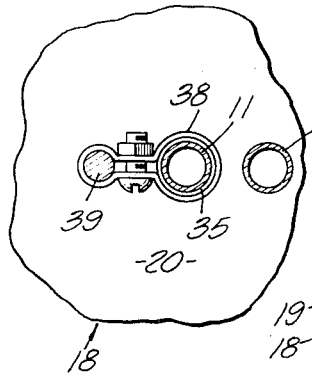
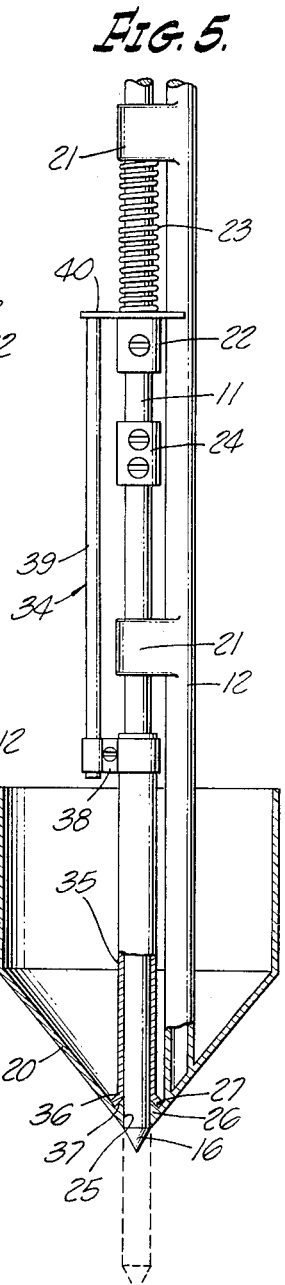
INVENTOR.
KAY KRARUP
BY
Lyon & Lyon
ATTORNEYS

United States Patent Office 3,504,647
Patented Apr. 7, 1970

---

3,504,647
FERTILIZER APPLICATOR
Kay Krarup, 115 Hickerson Drive,
Oildale, Calif. 93308
Continuation-in-part of application Ser. No. 394,214,
Sept. 3, 1964. This application Apr. 20, 1967, Ser.
No. 644,743
Int. Cl. A01c 5/02
U.S. Cl. 111—96                                 2 Claims

ABSTRACT OF THE DISCLOSURE

A fertilizer applicator having a hopper with a dibble rod mounted therein for extension and retraction through an aperture in the bottom of the hopper, the aperture having a sealing means to prevent excess discharge of fertilizer after use and further including a sealing tube coaxial with the dibble rod and having a sealing end complementary to the aperture sealing means.

---

This is a continuation-in-part of my earlier application Ser. No. 394,214, filed Sept. 3, 1964, now abandoned.

The present invention relates to a device for applying fertilizer, and finds particular use for the fertilizing of plants, trees and shrubs. More particularly, the present invention provides a means of inserting a quantity of fertilizer in the soil around plants so that the fertilizer will not be washed away but will reach the roots of the plant.

It is customary to fertilize plants and shrubs by merely dumping a quantity of fertilizer around the base of the plant. The problem with this method of application is that a certain quantity of the fertilizer will never reach the roots of the plant. When water is applied, some of the fertilizer will be washed away. In addition, some of the fertilizer will be carried away by wind and similar agents. The result is, that the actual quantity of fertilizer which gets to the roots of the plant is unknown. Where liquid chemical fertilizers are used, application on the surface will not assure that any of the fertilizer will reach the roots and the application of water may wash more away. Spading around a plant to get the fertilizer deeper into the soil may damage the roots.

Some devices have been made to inject a liquid fertilizer below the surface but such devices have not been adaptable to use with dry fertilizer and the converse is also true.

It is an object therefore, of the present invention, to provide a device for fertilizing plants which will prevent the fertilizer from being carried away by wind or water.

It is another object of this invention to provide a fertilizer applicator which inserts a certain quantity of fertilizer into the soil adjacent a plant so that the exact amount of fertilizer applied to each plant will be known.

It is a more specific object of this invention to provide a device for making a hole in the soil of a desired size and depth, preventing the topsoil from falling into that hole while filling the hole with fertilizer.

It is a further object of this invention to provide a fertilizer applicator device capable of use with either dry or liquid fertilizers after simple adjustment, while adequately sealing the discharge aperture after each use.

Further objects and advantages of this invention will be apparent from reading the following description together with the accompanying drawings in which:

FIGURE 4 is a side elevation of another embodiment of the applicator with the addition of the liquid fertilizer closure means showing the rod and closure means in the retracted position;

FIGURE 5 is a partial side elevation similar to FIGURE 4 showing the closure means in lower position and demonstrating in dotted line the extension of the dibble rod;

FIGURE 6 is a top sectional view taken along the line 6—6 of FIGURE 4; and

FIGURE 7 is a top sectional view taken along the line 7—7 of FIGURE 4.

Figure 1:
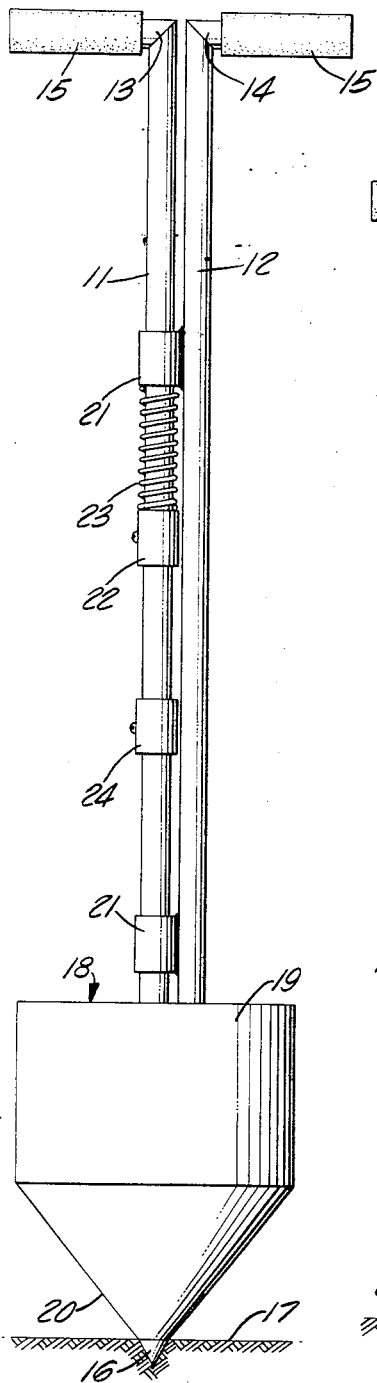
FIGURE 1 is a side elevation of one embodiment of the applicator made in accordance with this invention.
Figure 2:
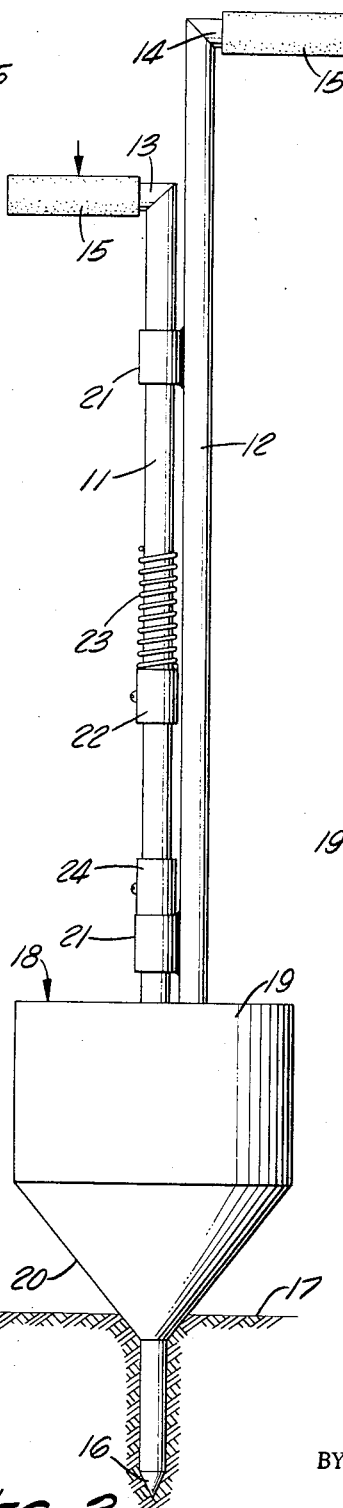
FIGURE 2 is another side elevation of the applicator showing the dibble rod extended make a hole in the soil.

In the drawings, the fertilizer applicator consists of two vertically extending rods, a dibble rod 11 and a stationary supporting rod 12. Both of these rods have handle sections 13 and 14 provided with suitable hand grips 15. The opposite end of dibble rod 11 has a pointed end 16 to facilitate the insertion of rod 11 into the soil 17.

To the opposite end of the stationary supporting rod 12 there is attached a fertilizer hopper 18. Hopper 18 consists of an upper cylindrical section 19 and a lower section 20 which is frustoconical in configuration. Intermediate the ends of supporting rod 12 there are attached two guide members 21 in the form of collars. These guide members 21 permit the vertical movement of dibble rod 11 while keeping said rod in alignment in the hopper 18.

On dibble rod 11 there is mounted an adjustable spring retaining collar 22. A floating return spring 23 is mounted coaxially on dibble rod 11 and positioned between the spring retaining collar 22 and the uppermost guide member 21. Depending upon the length of floating spring 23, the spring retaining collar 22 may be positioned so that the force of the spring will position the dibble rod 11 at any desired position. An adjustable stop collar 24 is also mounted on dibble rod 11 in order to fix the lowermost vertical travel of dibble rod 11.

The apex of the conical section 20 of hopper 18 is provided with a circular aperture 25 conforming closely in size to the exterior diameter of rod 11. An annular coving or fillet 26 is placed about aperture 25 having the outwardly sloping walls 27. The provision of the fillet 26 prevents the rod 11 from being jammed open by the fertilizer 28 after use.

Figure 3:
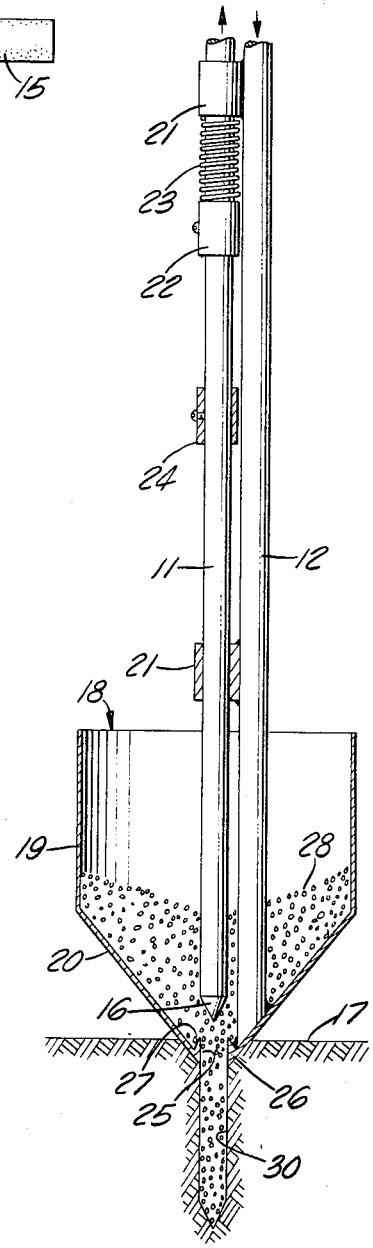
FIGURE 3 is a partial sectional side view showing the dibble rod retracted to permit the fertilizer to fill the hole.

The relationship and operation of the various parts described above will become more clear after reading the following description of the operation of the device. Fertilizer shown generally at 28 in FIGURE 3 is placed in the hopper 18. Hopper 18 may be of any suitable size consistent with convenience and ease of handling. When the site has been chosen for the application of fertilizer, the applicator is placed on the surface of the soil 17 as shown in FIGURE 1. Handle 13 of dibble rod 11 is then depressed in the direction shown by the arrow 29 forcing the pointed end 16 into the soil 17 to form a bore hole 30. Handle 13 is depressed until the stop collar 24 contacts the lowermost guide member 21. The depth of bore hole 30 is controllable by the position of stop collar 24 on rod 11. Handle 13 is then pulled upwardly, withdrawing rod 11 from bore hole 30 leaving an open hole in the soil.

In order to now fill the bore hole 30 with fertilizer, handle 13 is pulled upwardly to compress the spring 23 while the conical section 20 is held in place over the bore hole 30 by pushing downwardly on the handle 14 of supporting rod 12. The relative directions of the forces applied during this period of operation are shown in FIGURE 3 by the arrows 31 and 32. As the spring 23 is compressed the pointed end 16 moves up and out of the aperture 25 allowing the fertilizer 28 to fall down into the hole 30. When the hole is full, handle 13 is merely released, whereupon spring 23 acting upon retaining collar 22 will force the rod 11 downwardly closing the aperture so that the applicator may be removed from the site without further spillage of fertilizer. The outwardly sloping walls 27 of fillet 26 displace any fertilizer away from rod 11 as it moves downwardly to close aperture 25 thereby preventing the fertilizer from jamming the rod in the open position and further allowing the rod to be easily moved downwardly during the next fertilizer application. The frusto-conical shape of container 20 acts as a funnel for the fertilizer into the bore hole 30. In addition, the lower portion of the conical section 20 keeps topsoil from falling into the bore hole 30 while it is being filled with fertilizer.

Turning now to FIGURES 4 through 7, an additional closure means generally designated 34 may be added to the applicator to improve the operation of the device when using liquid fertilizers, soil conditioners or weed killers. Closure means 34 comprises a tubular element 35 mounted coaxially about the dibble rod 11 and having its lower end 36 normally coterminous with end 16 of rod 11. The lower end 36 is flared outwardly at 37 to form a surface complementary to surface 27 of fillet 26 for sealing closed the aperture 25.

Tubular element 35 is mounted for slidable movement on rod 11 by a bracket 38 to which is secured a member 39 which extends vertically alongside rods 11 and 12. At the upper extremity of member 39 a guide member 40 is attached. Guide member 40 has an aperture 41 whereby rod 11 extends therethrough. Guide member 40 also has a bifurcated end 42 which partially surrounds rod 12 to properly position closure means 34 while in use. Guide member 40 is mounetd intermediate spring 23 and retaining collar 22 whereby said closure means will be normally forced downwardly in sealing relationship.

The operation of the applicator with the closure means 34 should be readily apparent. Initially the downward force of spring 23 on guide means 40 and collar 22 will force flared portion 37 against surface 27 of fillet 26, as shown in FIGURE 5. And depending upon the relative location of collar 22 on rod 11, the spring will position the end 16 of rod 11 in the aperture 25. To form a hole in the ground, rod 11 is depressed and then withdrawn. Then by lifting upwardly on handle 13 against spring 23, rod 11 and closure means 34 are simultaneously lifted away from aperture 25 so that the contents of hopper 18 can flow into the hole in the ground. While this is being done, the sloping sides 20 of the hopper 18 prevent any loose soil from falling into the hole. When the desired amount of fertilizer has been discharged, the handle 13 is released whereby the closure means and the rod descend to their initial position once more.

While particular embodiments of the present invention have been shown and described, it will be obvious to those skilled in the art that changes and modifications may be made without departing from this invention in its broader aspects.

I claim:
1. A fertilizer applicator comprising:
   a hopper adapted to contain a quantity of fertilizer, said hopper having a frusto-conical lower portion, said lower portion having a single aperture in the bottom thereof;
   a stationary supporting rod attached to said hopper, said stationary rod having a number of guide collars thereon;
   a dibble rod slidably received in said guide collars, the lower projecting end of said dibble rod being conical, a plurality of collars mounted on said dibble rod intermediate the ends thereof, spring means mounted on said dibble rod intermediate one of the collars on said dibble rod and one of the collars mounted upon said stationary rod, said spring biasing said dibble rod to a position whereby the conical end of said dibble rod closes said aperture in said hopper, said dibble rod adapted to be projected through said aperture to form a hole in the soil;
   means for extracting said dibble rod from said aperture to allow said fertilizer to run into said hole;
   fillet means surrounding said aperture whereby particles of said fertilizer are normally biased away from said aperture; and,
   closure means coaxially mounted upon said dibble rod, said closure means having one end flared to provide a sealing portion complementary to said fillet means for closing said aperture, guide means connected to said closure means, said guide means mounted upon said dibble rod and adapted to be acted upon by said spring means to urge said closure means downwardly in sealing relationship with said fillet means.

2. A fertilizer applicator comprising:
   a hopper adapted to contain a quantity of fertilizer, said hopper having a frusto-conical lower portion, said lower portion having a single aperture in the bottom thereof;
   a stationary supporting rod attached at one end to said hopper, the other end of said supporting rod having a handle portion, said supporting rod having a number of guide collars mounted intermediate the ends thereof;
   a dibble rod slidably mounted vertically in said guide collars, said dibble rod having one end pointed, the other end of said dibble rod having a handle portion thereon, a number of adjustable stop collars mounted intermediate the ends of said dibble rod, a floating return spring mounted on said dibble rod and positioned between one of said stop collars and one of said guide collars;
   the pointed end of said dibble rod normally positioned coaxially in said aperture to close the same and operative to form a hole in the soil when the handle thereof is moved downwardly;
   said floating return spring operative to bias said pointed end of said dibble rod to a position wherein said aperture is closed, said dibble rod being movable upwardly against said spring to open said aperture whereby said fertilizer will run into said hole, said aperture having an annular fillet mounted about the periphery thereof in the interior of said hopper, the inner diameter of said fillet conformiing closely with that of said dibble rod, said fillet having angular sides sloping away from said dibble rod operative to bias fertilizer particles away from the pointed end of said dibble rod; and,
   closure means coaxially mounted upon said dibble rod, said closure means having a sealing portion complementary to said fillet means for closing said aperture, guide means connected to said closure means, said guide means mounted upon said dibble rod and adapted to be acted upon by said spring means to urge said closure means downwardly in sealing relationship with said fillet means.

References Cited

UNITED STATES PATENTS

| 2,005,598 | 6/1935 | Smith. | |
| 2,370,744 | 3/1945 | Molinare | 111—96 |
| 3,170,422 | 2/1965 | Gregory | 111—96 |

FOREIGN PATENTS

| 693,265 | 1930 | France. |
| 1,013,583 | 1952 | France. |
| 540,268 | 1941 | Great Britain. |

ROBERT E. BAGWILL, Primary Examiner

A. E. KOPECKI, Assistant Examiner